(12) United States Patent
Otani (10) Patent No.: US 12,377,624 B2
(45) Date of Patent: Aug. 5, 2025

(54) TIRE VULCANIZING APPARATUS

(71) Applicant: Sumitomo Rubber Industries, Ltd., Hyogo (JP)

(72) Inventor: Koji Otani, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 375 days.

(21) Appl. No.: 17/935,818

(22) Filed: Sep. 27, 2022

(65) Prior Publication Data

US 2023/0150218 A1 May 18, 2023

(30) Foreign Application Priority Data

Nov. 16, 2021 (JP) ................................. 2021-186585

(51) Int. Cl.
*B29D 30/06* (2006.01)

(52) U.S. Cl.
CPC .... *B29D 30/0629* (2013.01); *B29D 2030/063* (2013.01)

(58) Field of Classification Search
CPC ............ B29D 30/0606; B29D 30/0629; B29D 2030/063; B29D 2030/0631
USPC ............................................................ 425/27
See application file for complete search history.

(56) References Cited

U.S. PATENT DOCUMENTS 5,259,742 A * 11/1993 Ichikawa ........... B29D 30/0662
425/192 R
5,492,464 A * 2/1996 Irie ....................... B29C 33/202
425/46
5,690,970 A * 11/1997 Irie ..................... B29D 30/0662
425/46
2020/0316888 A1 10/2020 Otani

FOREIGN PATENT DOCUMENTS

JP 2020-168794 A 10/2020

* cited by examiner

*Primary Examiner* — Sedef E Paquette
(74) *Attorney, Agent, or Firm* — Studebaker Brackett PLLC (57) ABSTRACT

An upper side mold is lowered without mechanical combination between the mold and a lowering force application device.

A tire vulcanizing apparatus 1 includes a mold 2, a lowering force application device 25, and an attachment 4. The mold 2 includes a tread mold 6, an upper side mold 7U, and a lower side mold 7L. The lowering force application device 25 is disposed above the mold 2 and includes a rod 25a extending downward. The attachment 4 is fixed to an upper portion of the mold 2 without mechanical combination with the rod 25a. The attachment 4 includes a body 35 and an upward-downward movable portion 36 fixed to the upper side mold 7U. The upward-downward movable portion 36 lowers the upper side mold 7U upon receiving a lowering force F from the rod 25a.

6 Claims, 6 Drawing Sheets

TIRE VULCANIZING APPARATUS

BACKGROUND

Technical Field

The present disclosure relates to a tire vulcanizing apparatus.

Background Art

Japanese Laid-Open Patent Publication No. 2020-168794 discloses a tire vulcanizing apparatus including a mold in which a split position between a side mold and a tread mold is shifted inwardly in the tire radial direction. In this type of tire vulcanizing apparatus, when the tread mold is opened outwardly in the tire radial direction, the tread mold is likely to be caught by a side block of a tire, and removal of the tire from the mold tends to become impossible. Therefore, the tire vulcanizing apparatus includes a first lifting and lowering device for lowering an upper side mold in order to press-contract the width of the tire in advance. The first lifting and lowering device is disposed above the mold and is implemented by a cylinder including a rod.

In the tire vulcanizing apparatus described above, the rod of the first lifting and lowering device and the upper side mold are mechanically connected to each other. Therefore, an operation of connecting the mold to the rod of the first lifting and lowering device needs to be performed each time the mold is set and detached. This operation needs to be performed in a limited and narrow operation space, and requires much labor.

The present disclosure has been made in view of the aforementioned circumstances, and a main object of the present disclosure is to provide a tire vulcanizing apparatus capable of lowering an upper side mold without mechanical combination between a mold and a lowering force application device.

SUMMARY

The present disclosure is directed to a tire vulcanizing apparatus including: a mold in which a green tire is placed horizontally and vulcanized, the mold including a tread mold, an upper side mold, and a lower side mold; a lowering force application device disposed above the mold, the lowering force application device including a rod extending downward; and an attachment fixed to an upper portion of the mold without mechanical combination with the rod. The attachment includes a body, and an upward-downward movable portion that is movable relative to the body in an up-down direction and fixed to the upper side mold. The upward-downward movable portion lowers, upon receiving a lowering force from the rod, the upper side mold relative to the tread mold.

The tire vulcanizing apparatus of the present disclosure has the above-described structure, and thus can lower the upper side mold without mechanical combination between the mold and the lowering force application device.

DETAILED DESCRIPTION

One embodiment of the present disclosure will be described below with reference to the drawings.

Figure 1:
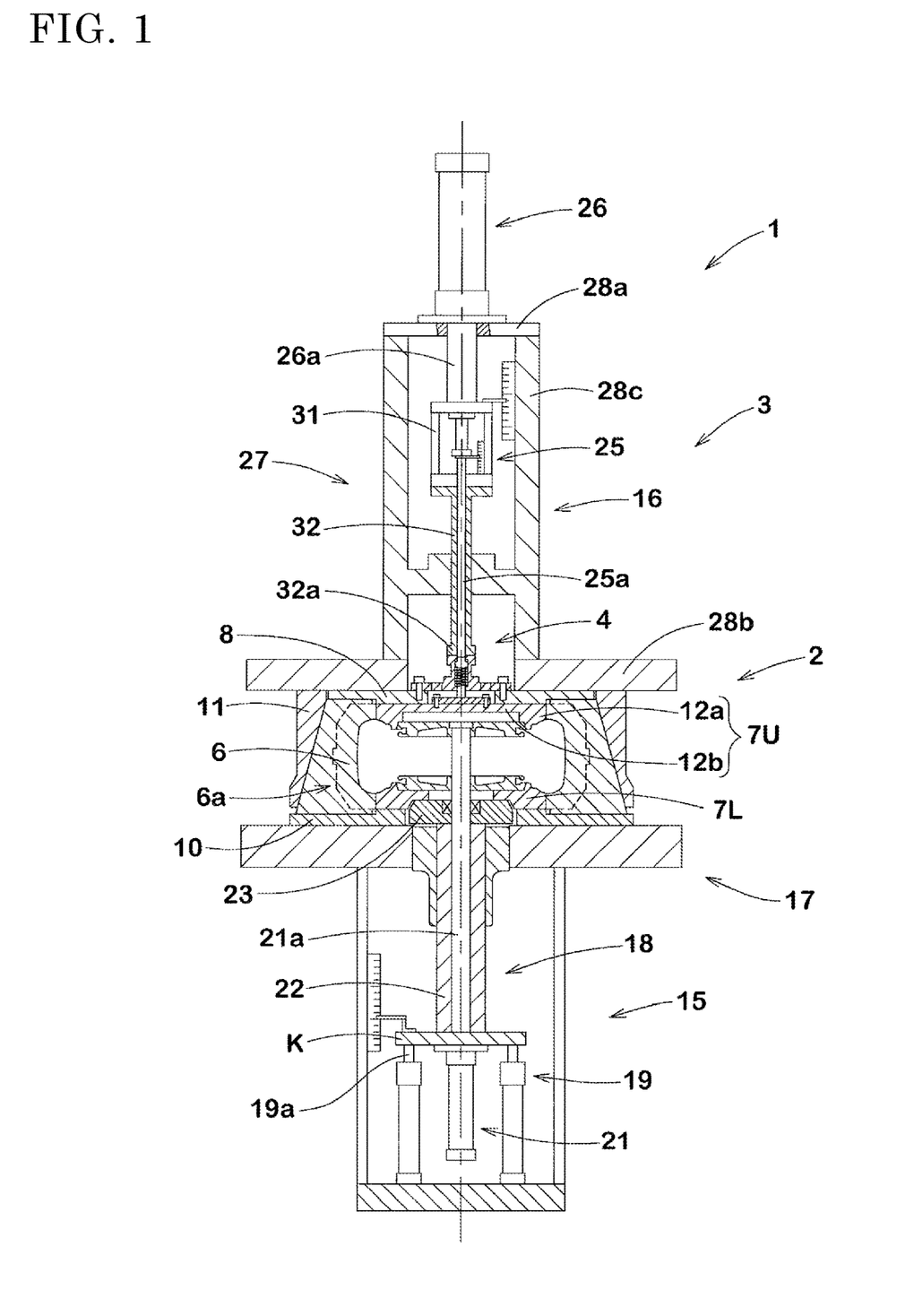
FIG. 1 is a side view conceptually showing a tire vulcanizing apparatus according to one embodiment of the present disclosure.

FIG. 1 is a cross-sectional view conceptually showing a tire vulcanizing apparatus (hereinafter, may be referred to as "apparatus") 1 according to one embodiment of the present disclosure. The apparatus 1 of the present disclosure vulcanizes a green tire T (shown in FIG. 2) to produce a pneumatic tire (not shown). The apparatus 1 is suitable for, for example, producing pneumatic tires for four-wheel-drive vehicles such as an SUV. However, the apparatus 1 is also used for producing pneumatic tires for passenger cars and motorcycles and heavy-duty pneumatic tires.

As shown in FIG. 1, the apparatus 1 of the present embodiment includes a mold 2 in which the green tire T is placed horizontally and vulcanized, an apparatus body 3 for supporting the mold 2 such that the mold 2 can be opened/closed, and an attachment 4 fixed to the upper portion of the mold 2. In the present embodiment, the tire axial direction of the green tire T in the mold 2 is oriented in the vertical (up-down) direction, and the tire circumferential direction and the tire radial direction of the green tire T are oriented in the horizontal direction. In the description herein, the circumferential direction, the axial direction, and the radial direction of the green tire T correspond to the tire circumferential direction, the tire axial direction, and the tire radial direction, respectively.

Figure 2:
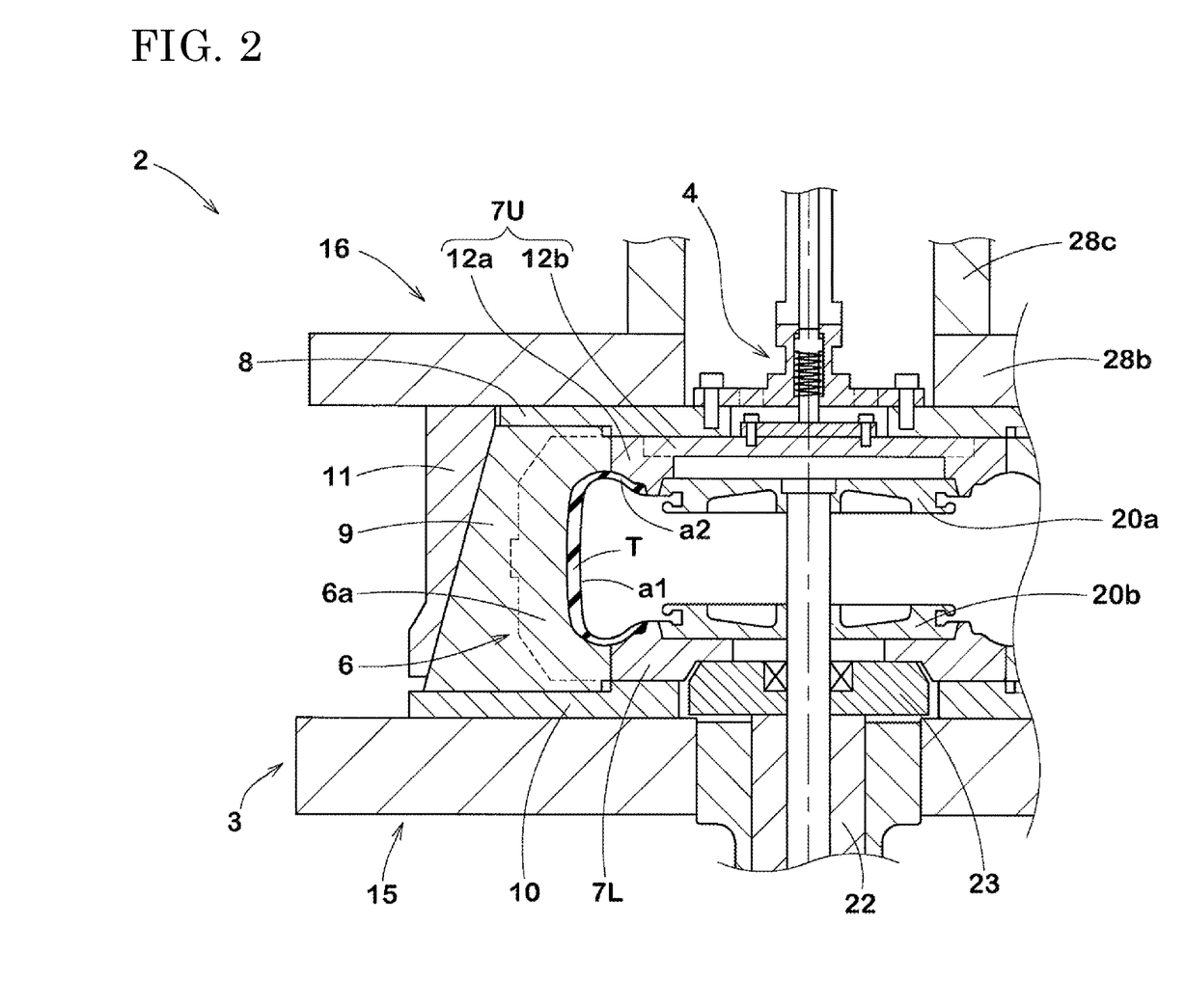
FIG. 2 is a partially enlarged view of FIG. 1.

FIG. 2 is an enlarged view of FIG. 1. The green tire T is shown in FIG. 2. As shown in FIG. 1 and FIG. 2, the mold 2 of the present embodiment includes a tread mold 6, an upper side mold 7U, a lower side mold 7L, an upper plate 8, a lower plate 10, and an actuator 11. In the present embodiment, the tread mold 6 has a known structure including a plurality of segments 6a that are segmented in the tire circumferential direction, and has, for example, a molding surface a1 that allows molding of the outer surface located outward of the maximum width position (now shown) of the pneumatic tire in the tire radial direction. In the present embodiment, each segment 6a is held by a sector 9 having a known structure so as to be replaceable. The upper plate 8 of the present embodiment has a known structure, and supports the tread mold 6. The lower plate 10 has, for example, a known structure, and allows the lower side mold 7L to be placed thereon. The actuator 11 of the present embodiment has a known structure, and supports the sector 9 so as to increase and reduce the diameter of the sector 9 in the tire radial direction.

In the present embodiment, each of the upper side mold 7U and the lower side mold 7L has a known structure, and has a molding surface a2 that allows molding of the outer surface, of the pneumatic tire, located inward of the tire maximum width position (not shown) in the tire radial direction. The upper side mold 7U includes, for example, a first portion 12a that includes the molding surface a2 and annularly extends, and a second portion 12b that is connected to the inner circumferential side of the first portion 12a and that has a disk-like shape having a thickness less than the first portion 12a.

As shown in FIG. 1, the apparatus body 3 includes a lower body 15 disposed below the mold 2 and an upper body 16 disposed above the mold 2.

The lower body 15 of the present embodiment has a known structure that includes a lower base 17 for fixing the lower plate 10, a center mechanism 18 attached to the lower base 17, and a first lifting and lowering device 19 capable of relatively moving the lower side mold 7L relative to the lower plate 10 in the up-down direction. The center mechanism 18 of the present embodiment includes a vulcanization bladder (not shown). The center mechanism 18 includes an upper grip ring 20a (shown in FIG. 2) for holding the upper end of the vulcanization bladder, a lower grip ring 20b for holding the lower end of the vulcanization bladder, and a second lifting and lowering device 21 for relatively moving the upper grip ring 20a relative to the lower grip ring 20b in the up-down direction.

In the present embodiment, the first lifting and lowering device 19 and the second lifting and lowering device 21 are implemented by cylinder mechanisms having known structures and having rods 19a and 21a, respectively, extending in the up-down direction. To the rod 19a of the first lifting and lowering device 19, a first support cylinder 22 having a cylindrical shape is fixed via a plate-shaped connecting portion K. The first support cylinder 22 supports the lower side mold 7L via a holder 23. The rod 21a of the second lifting and lowering device 21 extends in the center hole of the first support cylinder 22, and the upper grip ring 20a is fixed to the rod 21a.

The upper body 16 of the present embodiment includes, for example, a lowering force application device 25, an upper lifting and lowering device 26, and an upper base 27. The lowering force application device 25 of the present embodiment has, for example, a function of lowering the upper side mold 7U relative to the tread mold 6.

The upper base 27 includes a top plate 28a for supporting the upper lifting and lowering device 26, a lifting and lowering plate 28b disposed below the top plate 28a, and a support member 28c that connects the lifting and lowering plate 28b and the top plate 28a to each other and extends in the up-down direction.

The lifting and lowering plate 28b supports the actuator 11. The lifting and lowering plate 28b can be moved relative to the upper plate 8 in the up-down direction by a lifting and lowering device (not shown) that is implemented by, for example, a cylinder mechanism and that has a known structure.

The upper lifting and lowering device 26 has, for example, a function of moving the upper plate 8 in the up-down direction. The upper lifting and lowering device 26 of the present embodiment is implemented by a cylinder mechanism having a known structure and having a rod 26a. A second support cylinder 32 having a cylindrical shape is fixed to the lower end of the rod 26a of the upper lifting and lowering device 26 via a connecting portion 31. In the present embodiment, a flange portion 32a protruding toward the outer circumferential side is formed at the lower end of the second support cylinder 32.

The lowering force application device 25 includes a rod 25a extending downward. The lowering force application device 25 is, for example, implemented by a cylinder mechanism having a known structure and having the rod 25a. Thus, the rod 25a of the lowering force application device 25 applies a lowering force acting in the downward direction. In the present embodiment, the lowering force application device 25 is supported by the connecting portion 31. The rod 25a of the lowering force application device 25 extends through the center hole of the second support cylinder 32 in the up-down direction. The attachment 4 is disposed below the rod 25a. The rod 25a of the present embodiment extends downward of the lower end of the second support cylinder 32.

Figure 3:
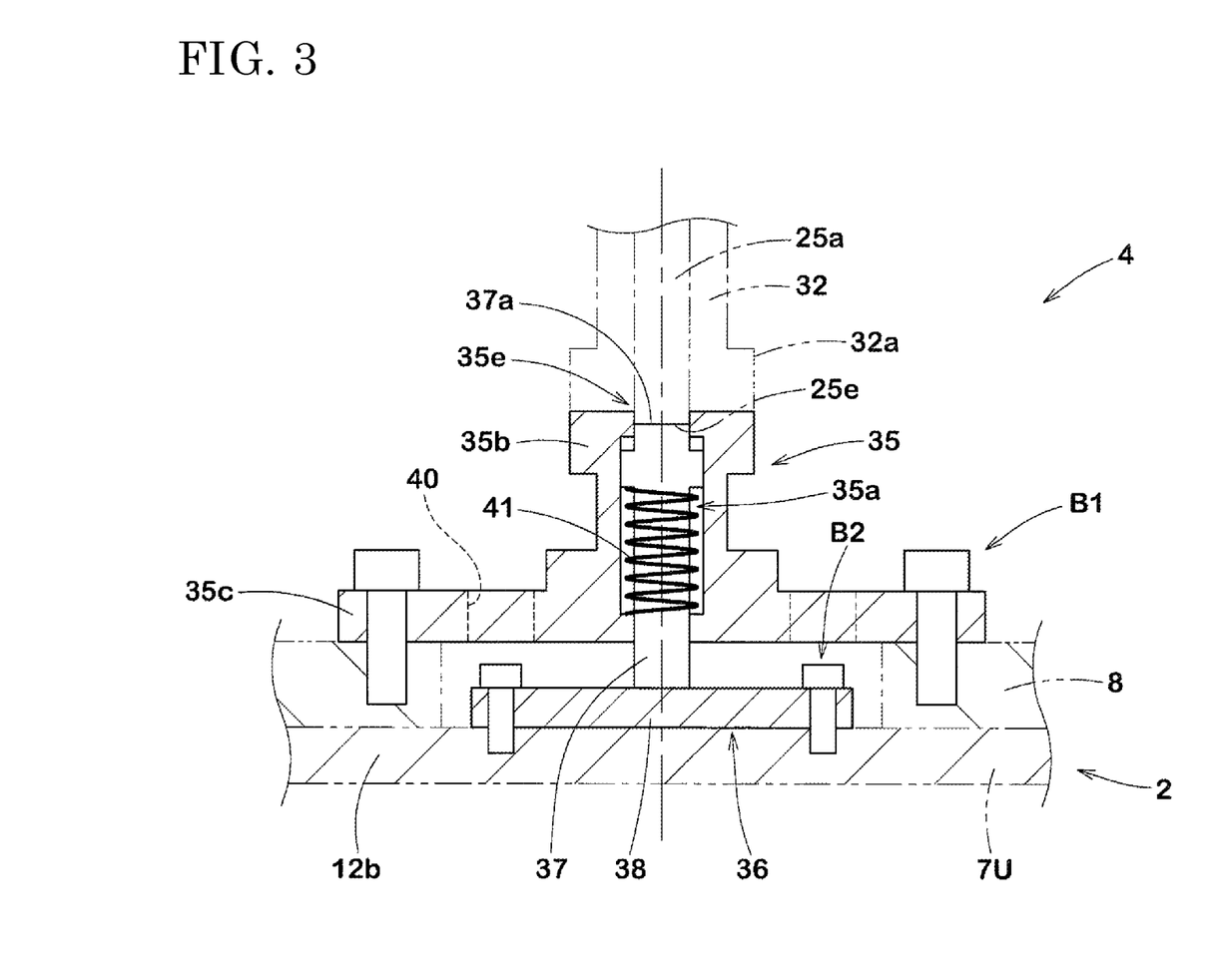
FIG. 3 is an enlarged view of an attachment in FIG. 1.

FIG. 3 is an enlarged view of the attachment 4 in FIG. 1. As shown in FIG. 3, the attachment 4 includes a body 35 and an upward-downward movable portion 36 that is movable relative to the body 35 in the up-down direction. The body 35 of the present embodiment includes an opening 35a penetrating in the up-down direction, a first flange portion 35b disposed at the upper end of the body 35 so as to protrude toward the outer circumferential side, and a second flange portion 35c disposed at the lower end of the body 35 so as to protrude toward the outer circumferential side. The upward-downward movable portion 36 of the present embodiment includes an axial portion 37 extending in the up-down direction, and a plate-shaped connecting portion 38 connected to the lower end of the axial portion 37.

The body 35 is, for example, fixed by bolts (bolt-fixing B1) to the mold 2 from the upper side of the mold 2. In the present embodiment, the second flange portion 35c and the upper plate 8 are fixed by bolts (bolt-fixing B1) to each other. The first flange portion 35b is in contact with the flange portion 32a of the second support cylinder 32. The flange portion 32a of the second support cylinder 32 and the first flange portion 35b are, for example, preferably fixed by a fixing tool (not shown) having a known structure so as to be attachable/detachable.

The upward-downward movable portion 36 is, for example, fixed by bolts (bolt-fixing B2) to the upper side mold 7U from thereabove. In the present embodiment, the connecting portion 38 and the second portion 12b of the upper side mold 7U are fixed by bolts that are inserted from through holes 40 disposed in the second flange portion 35c. In the present embodiment, the rod 25a is inserted in the opening 35a such that an upper end 37a of the axial portion 37 and a lower end 25e of the rod 25a of the lowering force application device 25 are in contact with each other. Thus, the rod 25a and the attachment 4 (the axial portion 37 of the upward-downward movable portion 36) are not mechanically combined with each other. In the present embodiment, the upper end 37a of the axial portion 37 is disposed downward of the upper end 35e of the opening 35a.

Figure 4A:
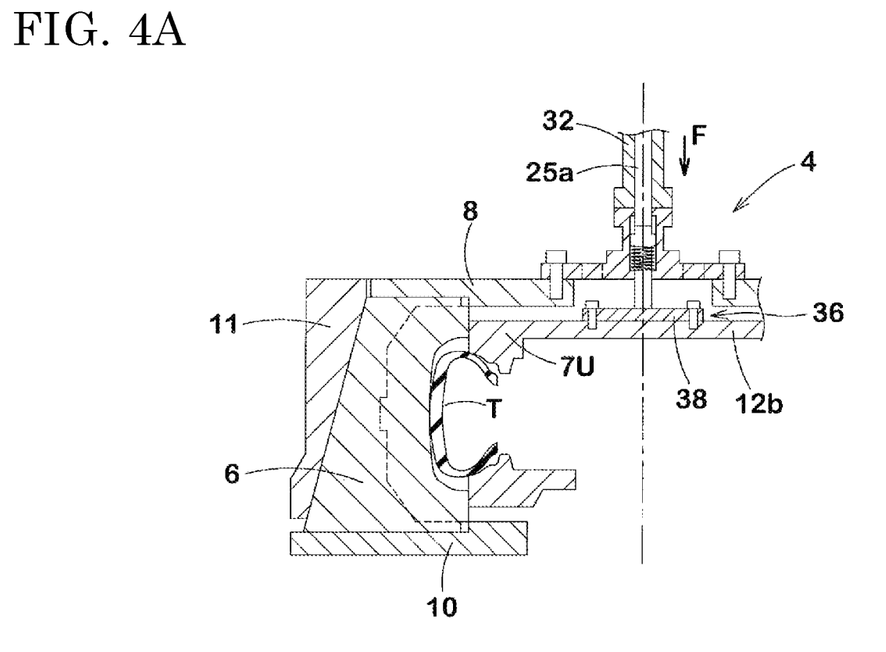
FIG. 4A is a cross-sectional view conceptually showing a state where a lowering force is applied by a lowering force application device.

Thus, as shown in FIG. 4A, the upward-downward movable portion 36 can lower, upon receiving a lowering force F from the rod 25a, the upper side mold 7U fixed to the connecting portion 38 relative to the tread mold 6. Meanwhile, when downward extension (lowering force F) of the rod 25a is released and the rod 25a is moved upward, the rod 25a and the axial portion 37 of the upward-downward movable portion 36 enter a state of being (instantaneously) separated from each other (shown in FIG. 4B). By extension and contraction of the rod 26a of the upper lifting and lowering device 26, the upper plate 8 and the tread mold 6 can be integrally moved in the up-down direction via the connecting portion 31, the second support cylinder 32, and the body 35 (not shown).

Figure 4B:
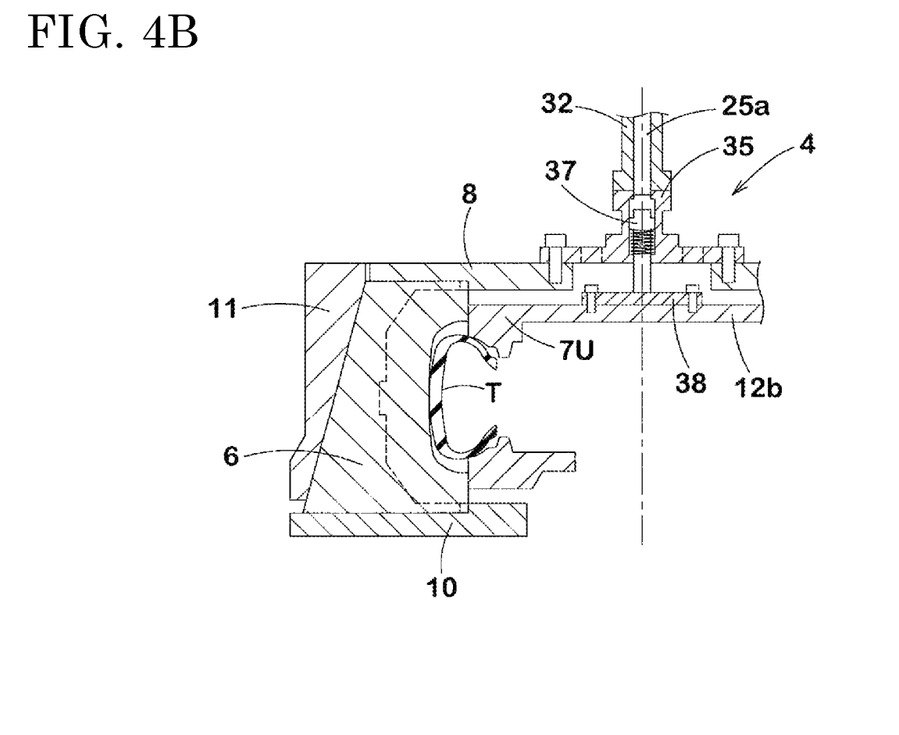
FIG. 4B is a cross-sectional view conceptually showing a state where the lowering force has been released.

The attachment 4 further includes a coil spring 41. The coil spring 41 is movable together with the axial portion 37 in the opening 35a, and is held in a state of being prevented from being removed from the opening 35a. Thus, upon receiving the lowering force F from the rod 25a, the axial portion 37 is lowered, whereby a compressive force acts on the coil spring 41 (shown in FIG. 4A). When the lowering force F is released and the state is as shown in FIG. 4B, the compressive force of the coil spring 41 can urge the upward-downward movable portion 36 upward relative to the body 35. Thus, by the coil spring 41, the upward-downward movable portion 36 can be moved upward together with the upper side mold 7U so as to come into contact with the rod 25a. The "state where the coil spring 41 is prevented from being removed" is achieved by a known structure as shown in the drawings, and the description thereof is omitted.

Thus, in the apparatus 1 of the present embodiment, the upward-downward movable portion 36 of the attachment 4 lowers, upon receiving the lowering force F of the lowering force application device 25, the upper side mold 7U relative to the tread mold 6. The mold 2 and the lowering force application device 25 are mounted via the attachment 4 that is not mechanically combined with the rod 25a of the lowering force application device 25. Therefore, in the apparatus 1, the upper side mold 7U can be lowered without mechanical combination between the mold 2 and the lowering force application device 25.

Furthermore, the apparatus 1 of the present embodiment preferably includes a controller (not shown) for operating each of the lifting and lowering devices 19, 21, and 26, and the lowering force application device 25. The controller is preferably implemented by, for example, a computer or the like, and stores, for example, an operation procedure and an operation amount for each of the lifting and lowering devices 19, 21, and 26, and the lowering force application device 25.

Figure 5A:
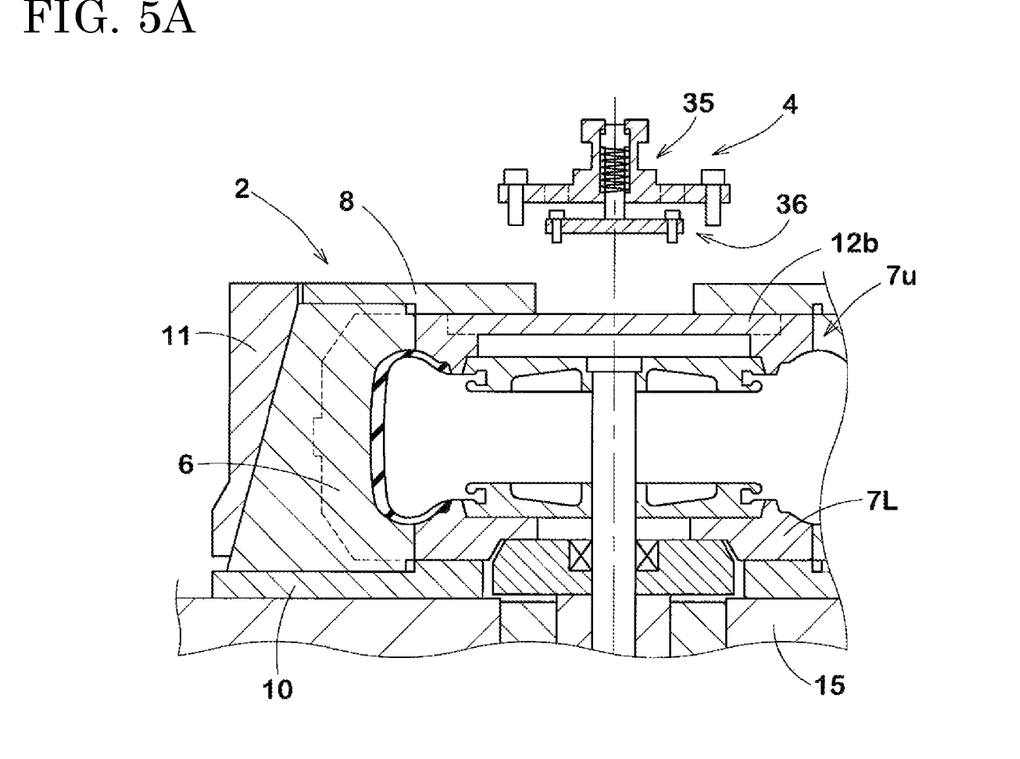
FIG. 5A is a cross-sectional view conceptually showing a step of assembling the tire vulcanizing apparatus.
Figure 5B:
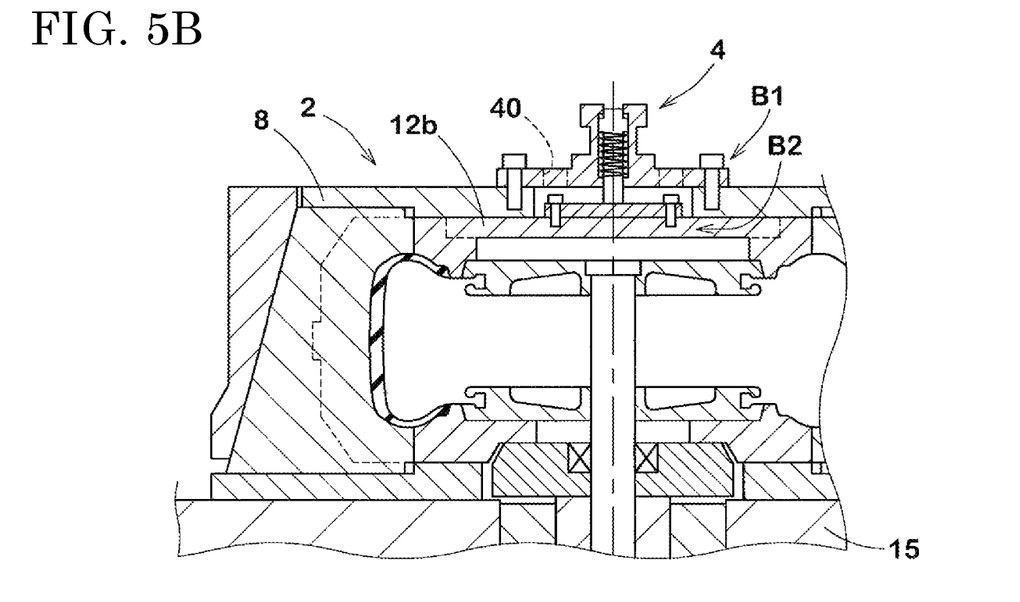
FIG. 5B is a cross-sectional view conceptually showing the step of assembling the tire vulcanizing apparatus.
Figure 6:
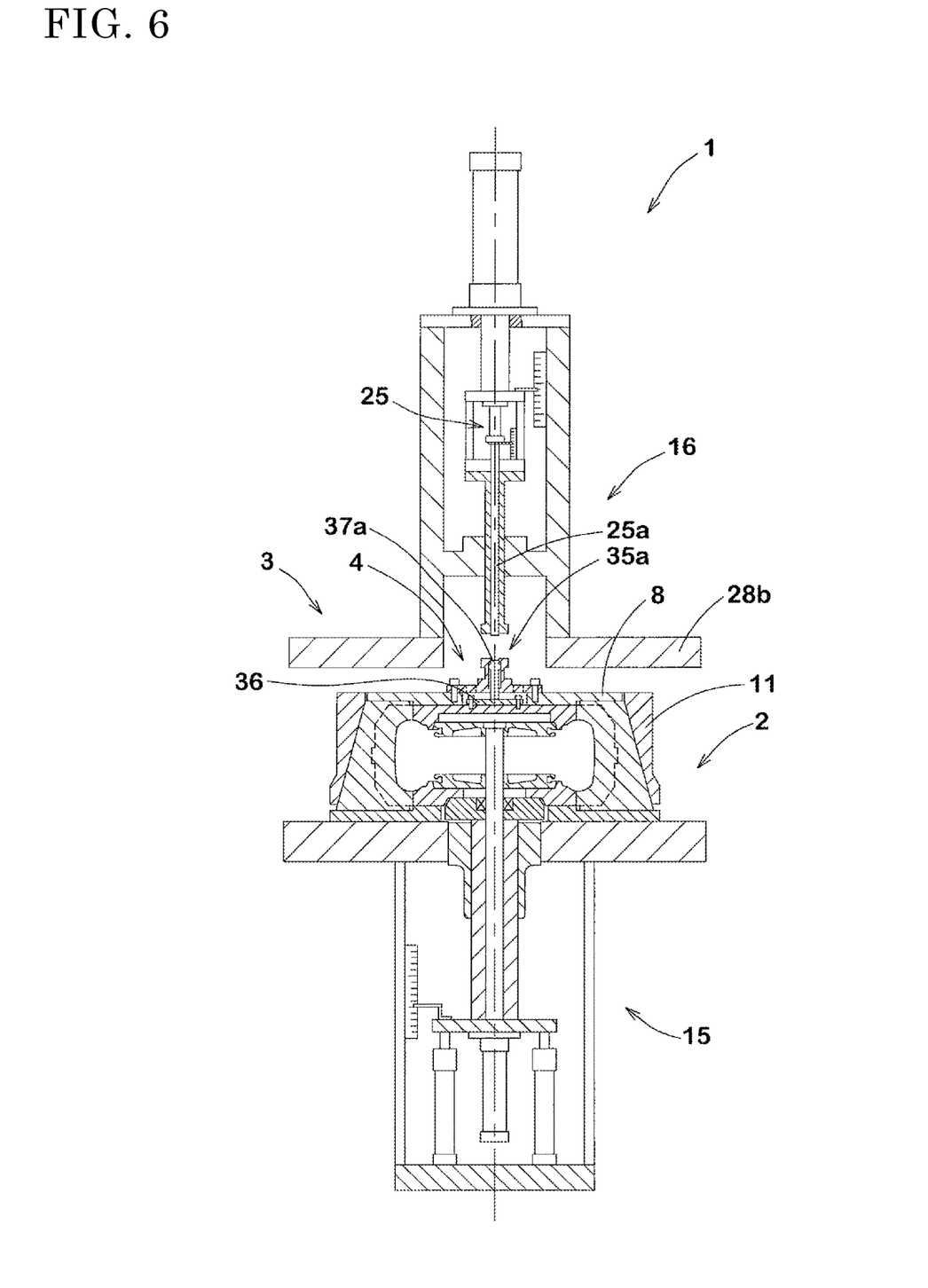
FIG. 6 is a cross-sectional view conceptually showing the step of assembling the tire vulcanizing apparatus.

Next, an assembling step of assembling the apparatus 1 having such a structure will be described. FIG. 5 and FIG. 6 are schematic diagrams illustrating a flow of the assembling step. As shown in FIG. 5A, the mold 2 and the attachment 4 are firstly prepared. In the present embodiment, the mold 2 is mounted to the lower body 15. The mold 2 includes, for example, the tread mold 6, the upper side mold 7U, the lower side mold 7L, the actuator 11, the upper plate 8, and the lower plate 10, which are in a closed state (the same state as a state during vulcanization). The attachment 4 is disposed above the mold 2.

Subsequently, as shown in FIG. 5B, the attachment 4 is fixed to the mold 2. The body 35 of the attachment 4 is fixed by bolts (bolt-fixing B1) to the upper plate 8. By using the through holes 40 of the second flange portion 35c, the upward-downward movable portion 36 of the attachment 4 is fixed by bolts (bolt-fixing B2) to the upper side mold 7U. Thus, in the apparatus 1 of the present embodiment, the attachment 4 is easily attached by using a wide space above the mold 2.

Subsequently, as shown in FIG. 6, the upper body 16 is attached on the mold 2. In the present embodiment, the lifting and lowering plate 28b of the upper body 16 is fixed to the actuator 11, and the rod 25a of the lowering force application device 25 is inserted in the opening 35a so as to come into contact with the upper end 37a of the axial portion 37 of the upward-downward movable portion 36. Thus, the upper body 16 and the mold 2 are also attached to each other by using a wide space above the mold 2, whereby labor can be reduced.

Although the particularly preferred embodiment of the present disclosure has been described above in detail, the present disclosure is not limited to the illustrated embodiment, and various modifications can be made to implement the technique of the present disclosure.

[Appendix]

The present disclosure includes the following aspects.

[Disclosure 1]

A tire vulcanizing apparatus including:
a mold in which a green tire is placed horizontally and vulcanized, the mold including a tread mold, an upper side mold, and a lower side mold;
a lowering force application device disposed above the mold, the lowering force application device including a rod extending downward; and
an attachment fixed to an upper portion of the mold without mechanical combination with the rod, in which
the attachment includes a body, and an upward-downward movable portion that is movable relative to the body in an up-down direction and fixed to the upper side mold, and
the upward-downward movable portion lowers, upon receiving a lowering force from the rod, the upper side mold relative to the tread mold.

[Disclosure 2]

The tire vulcanizing apparatus according to disclosure 1, in which the body of the attachment is fixed by a bolt to the mold from above the mold.

[Disclosure 3]

The tire vulcanizing apparatus according to disclosure 1 or 2, in which the upward-downward movable portion is fixed by a bolt to the upper side mold from thereabove.

[Disclosure 4]

The tire vulcanizing apparatus according to disclosure 3, in which the upward-downward movable portion is urged upward relative to the body so as to move the upper side mold to an upper position due to the upward-downward movable portion being separated from the rod.

[Disclosure 5]

The tire vulcanizing apparatus according to disclosure 4, in which the attachment includes a coil spring for urging the upward-downward movable portion upward relative to the body.

[Disclosure 6]

The tire vulcanizing apparatus according to disclosure 5, in which
the body has an opening penetrating in an up-down direction, and
the upward-downward movable portion and the coil spring are movable in the opening and are held in a state of being prevented from being removed from the opening.

What is claimed is:

1. A tire vulcanizing apparatus comprising:
a mold in which a green tire is placed horizontally and vulcanized, the mold including a tread mold, an upper side mold, and a lower side mold;
a lowering force application device disposed above the mold, the lowering force application device including a rod extending downward; and
an attachment disposed above the mold, wherein
the attachment includes a body without mechanical combination with the upper side mold, and an upward-downward movable portion that is movable relative to the body in an up-down direction and fixed to the upper side mold, and
the upward-downward movable portion is in contact with a lower end of the rod without mechanical combination with the rod such that the upward-downward movable portion lowers, upon receiving a lowering force from the rod, the upper side mold relative to the tread mold.

2. The tire vulcanizing apparatus according to claim 1, wherein the body of the attachment is fixed by a bolt to the mold from above the mold.

3. The tire vulcanizing apparatus according to claim 1, wherein the upward-downward movable portion is fixed by a bolt to the upper side mold from thereabove.

4. The tire vulcanizing apparatus according to claim 3, wherein the upward-downward movable portion is urged upward relative to the body so as to move the upper side mold to an upper position due to the upward-downward movable portion being separated from the rod.

5. The tire vulcanizing apparatus according to claim 4, wherein the attachment includes a coil spring for urging the upward-downward movable portion upward relative to the body.

6. The tire vulcanizing apparatus according to claim 5, wherein
- the body has an opening penetrating in an up-down direction, and
- the upward-downward movable portion and the coil spring are movable in the opening and are held in a state of being prevented from being removed from the opening.

\* \* \* \* \*